Patented Jan. 15, 1946

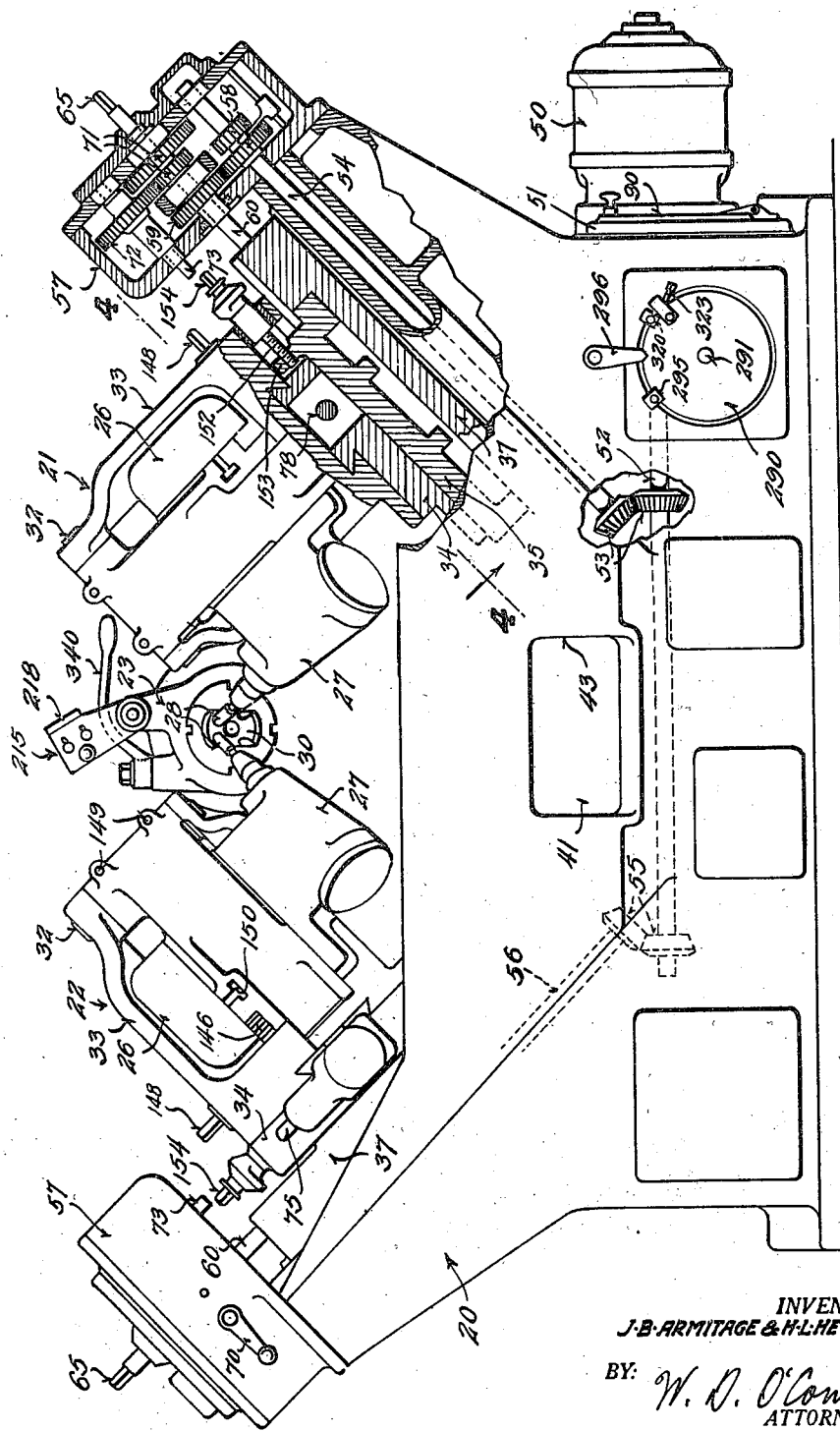

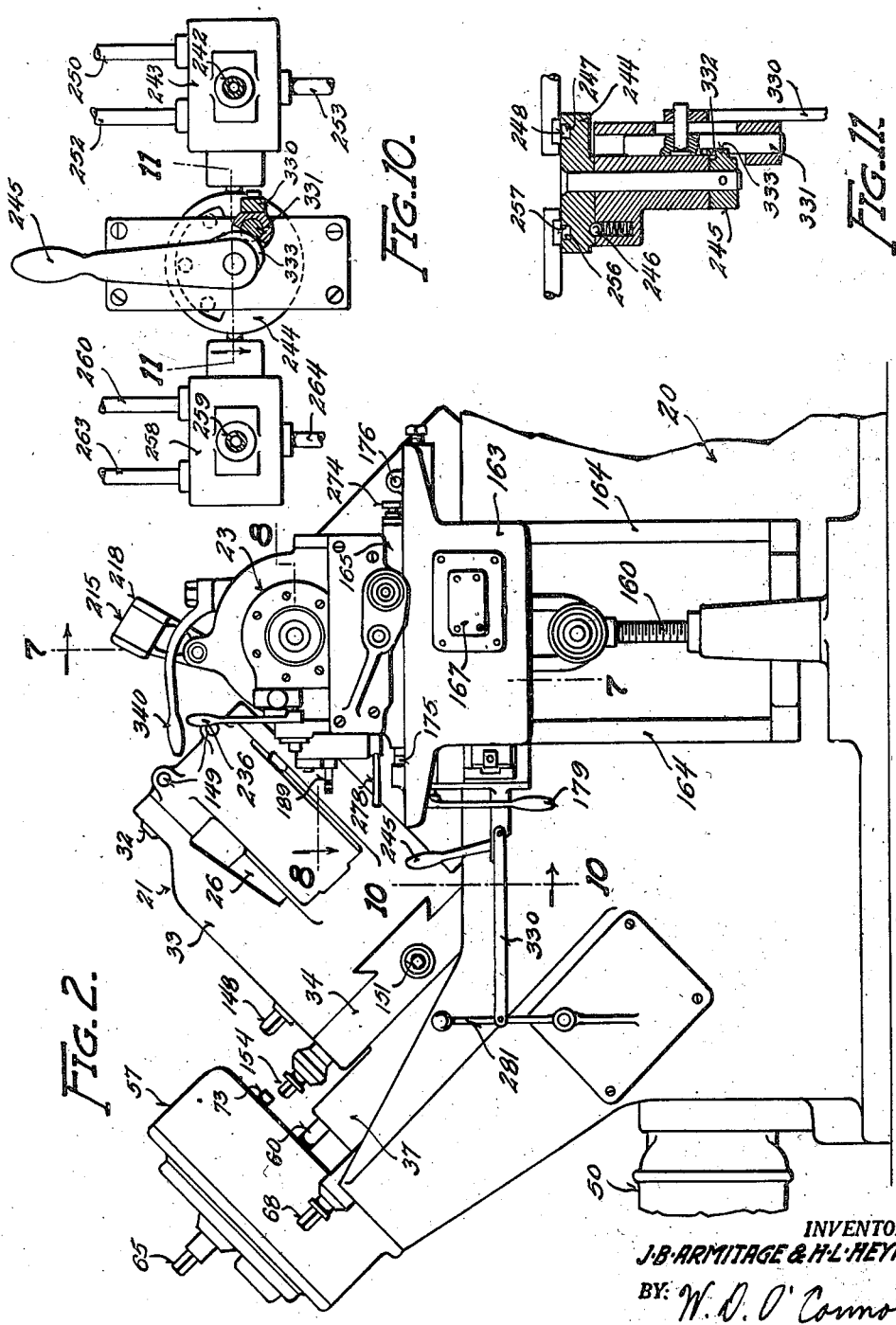

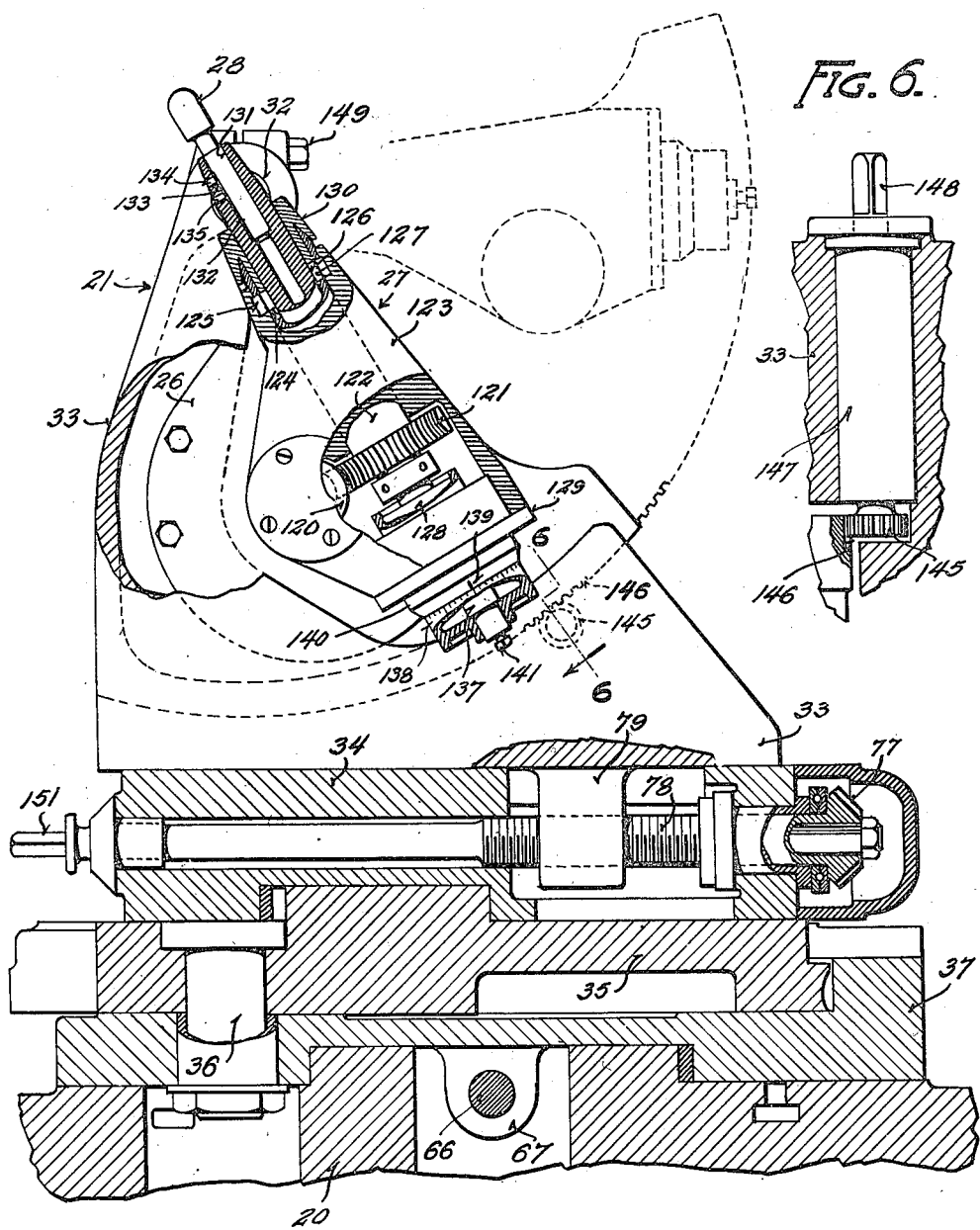

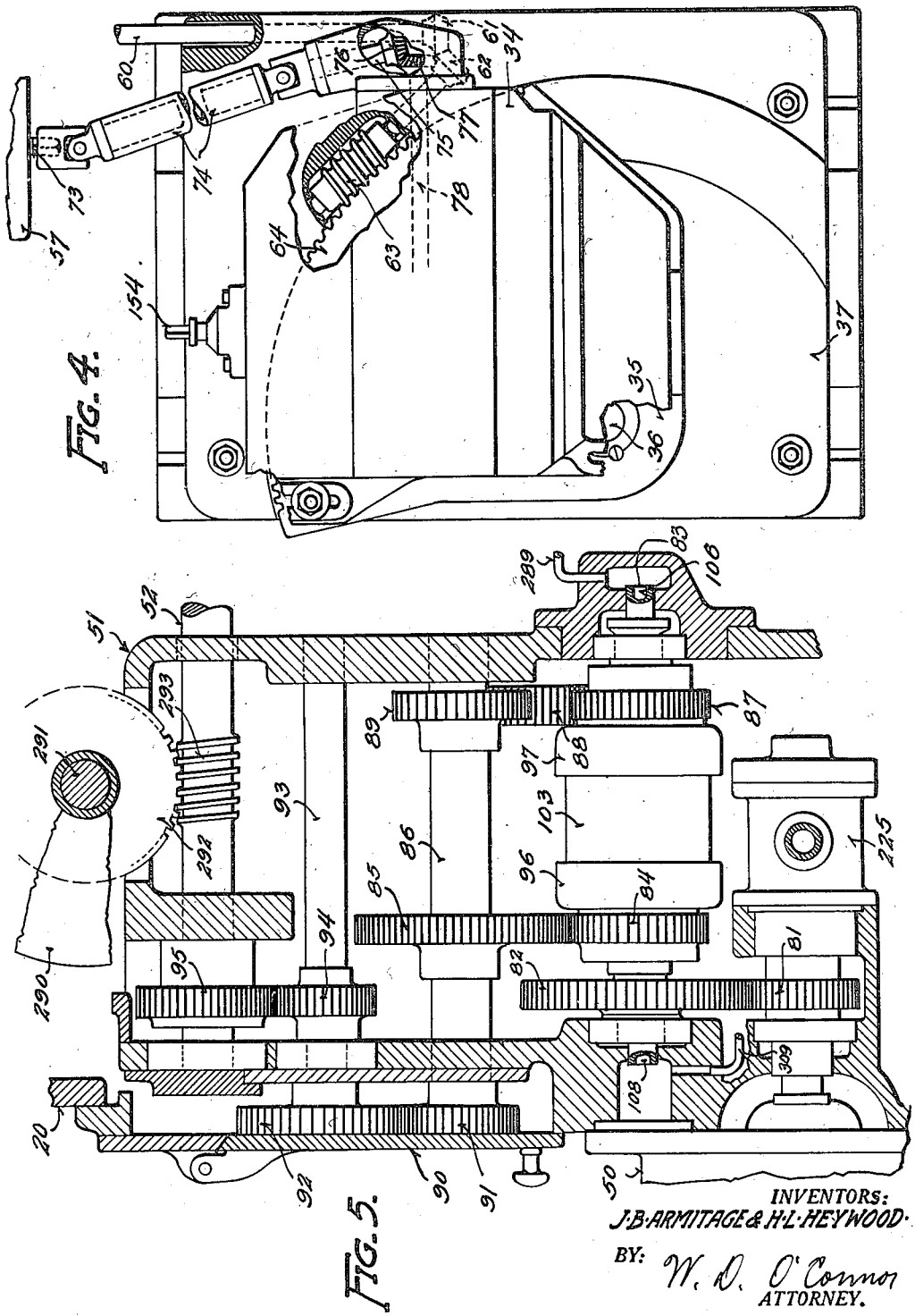

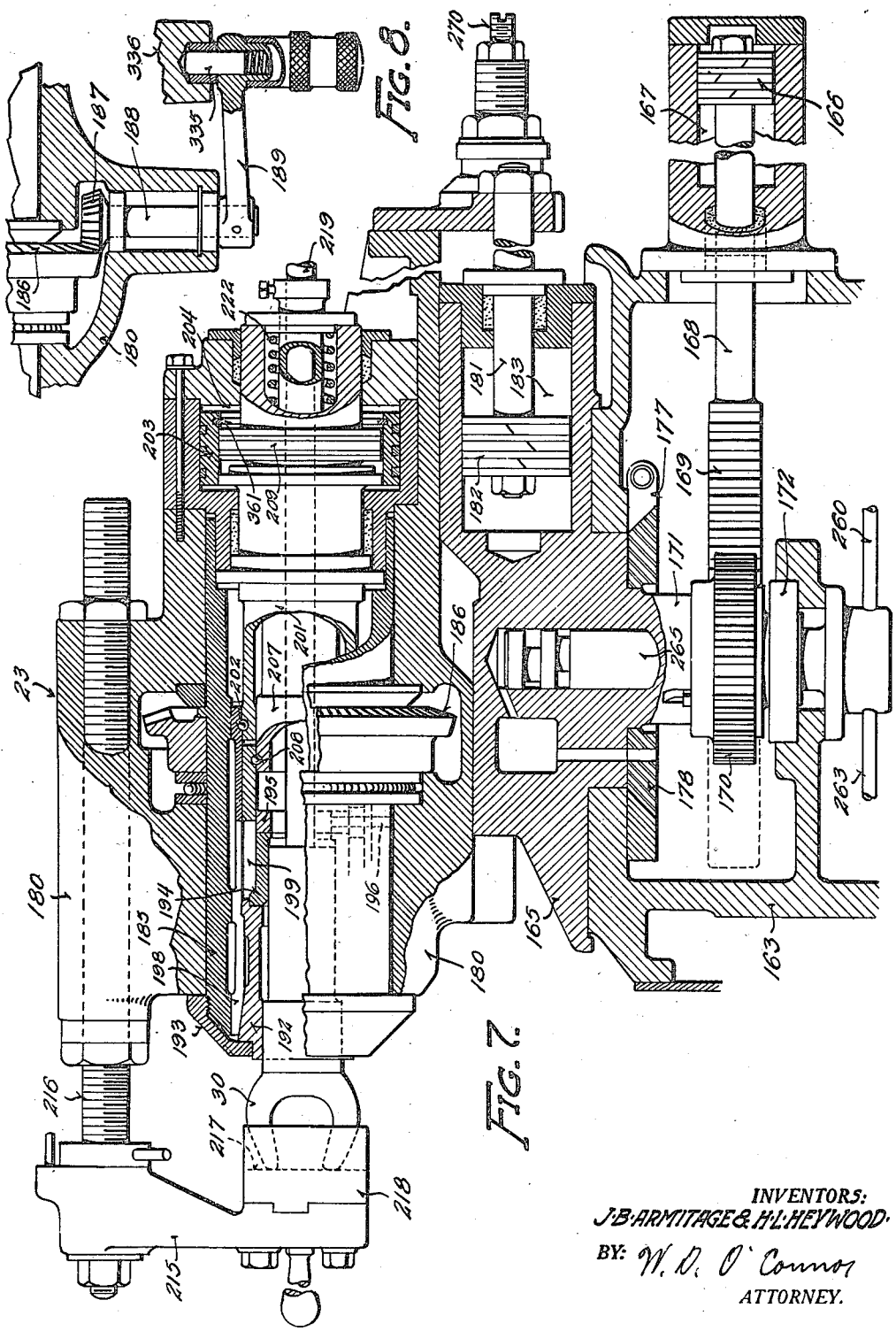

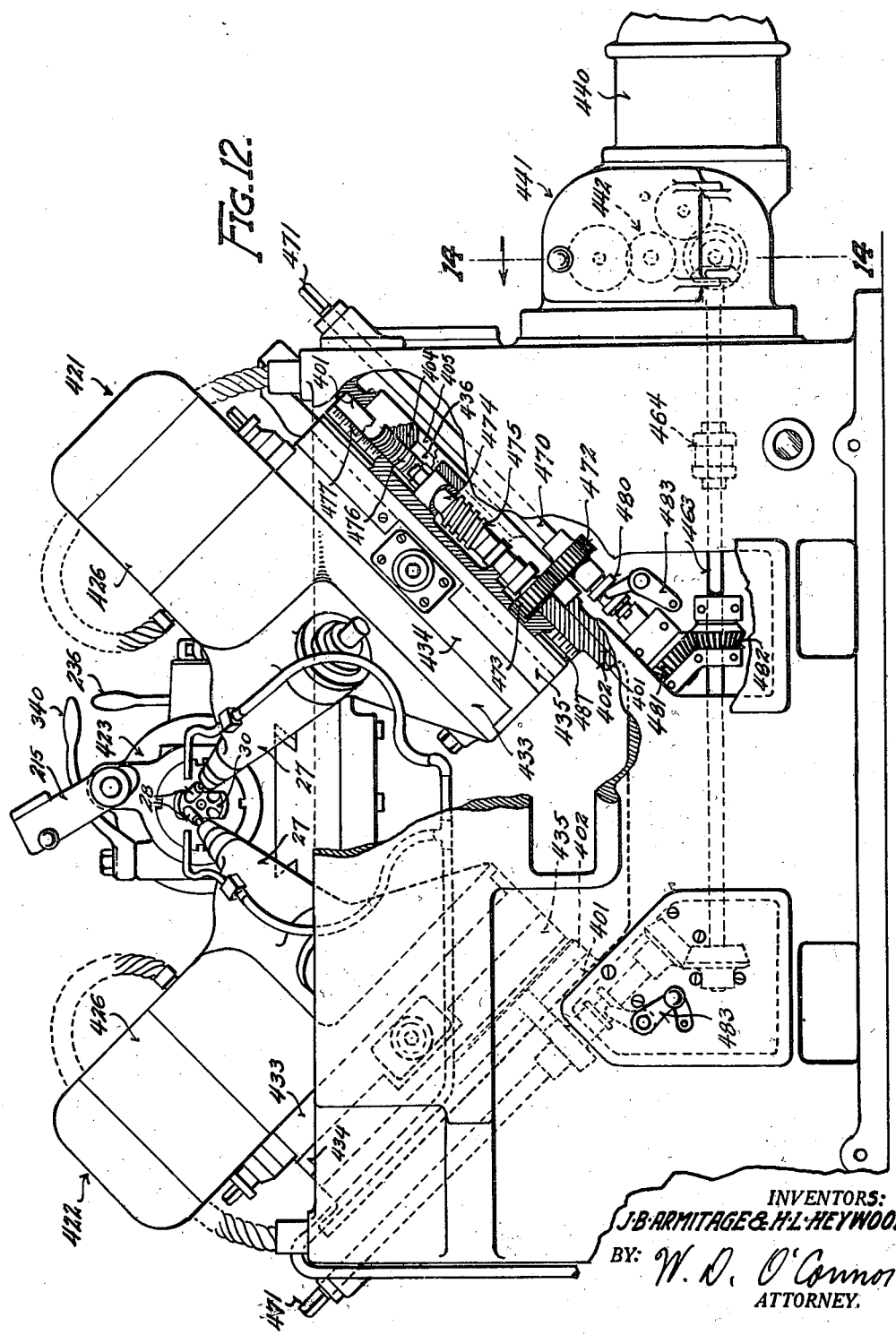

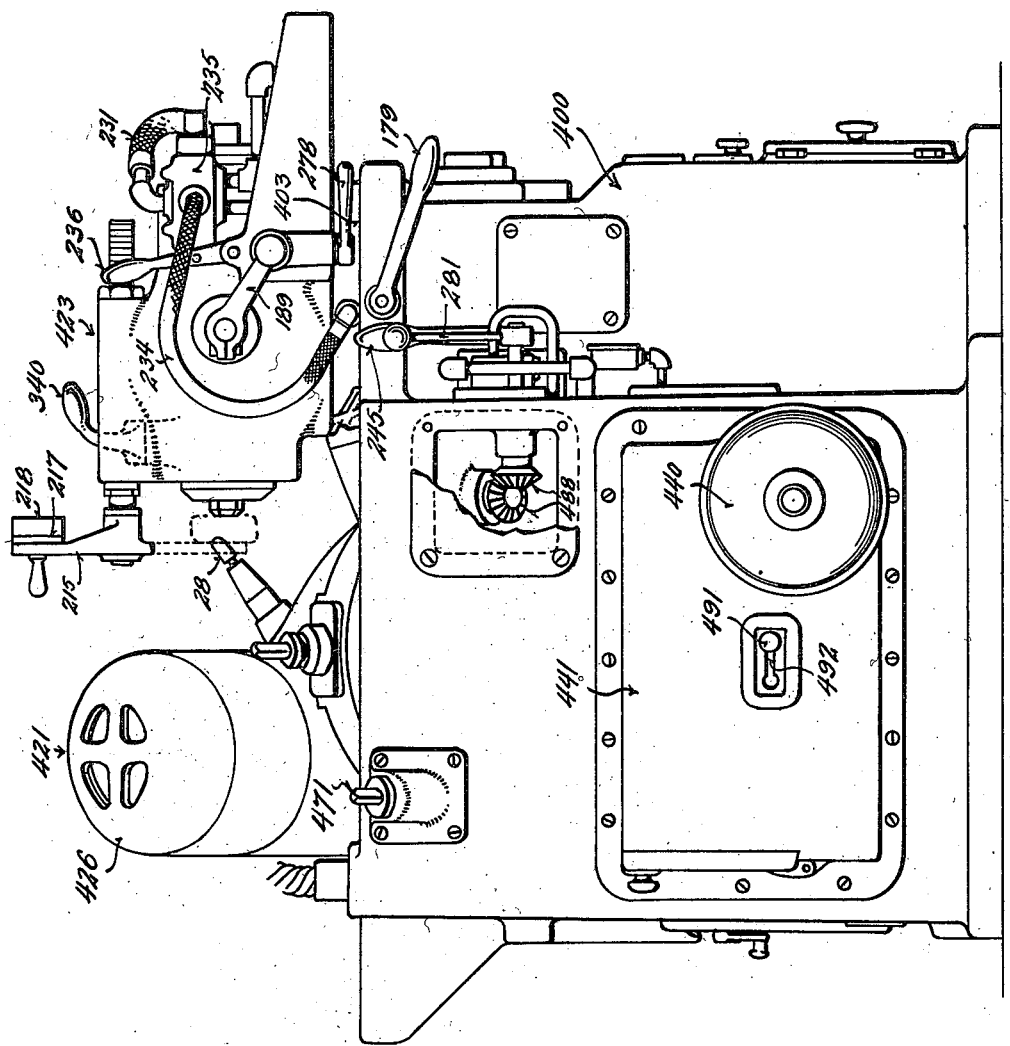

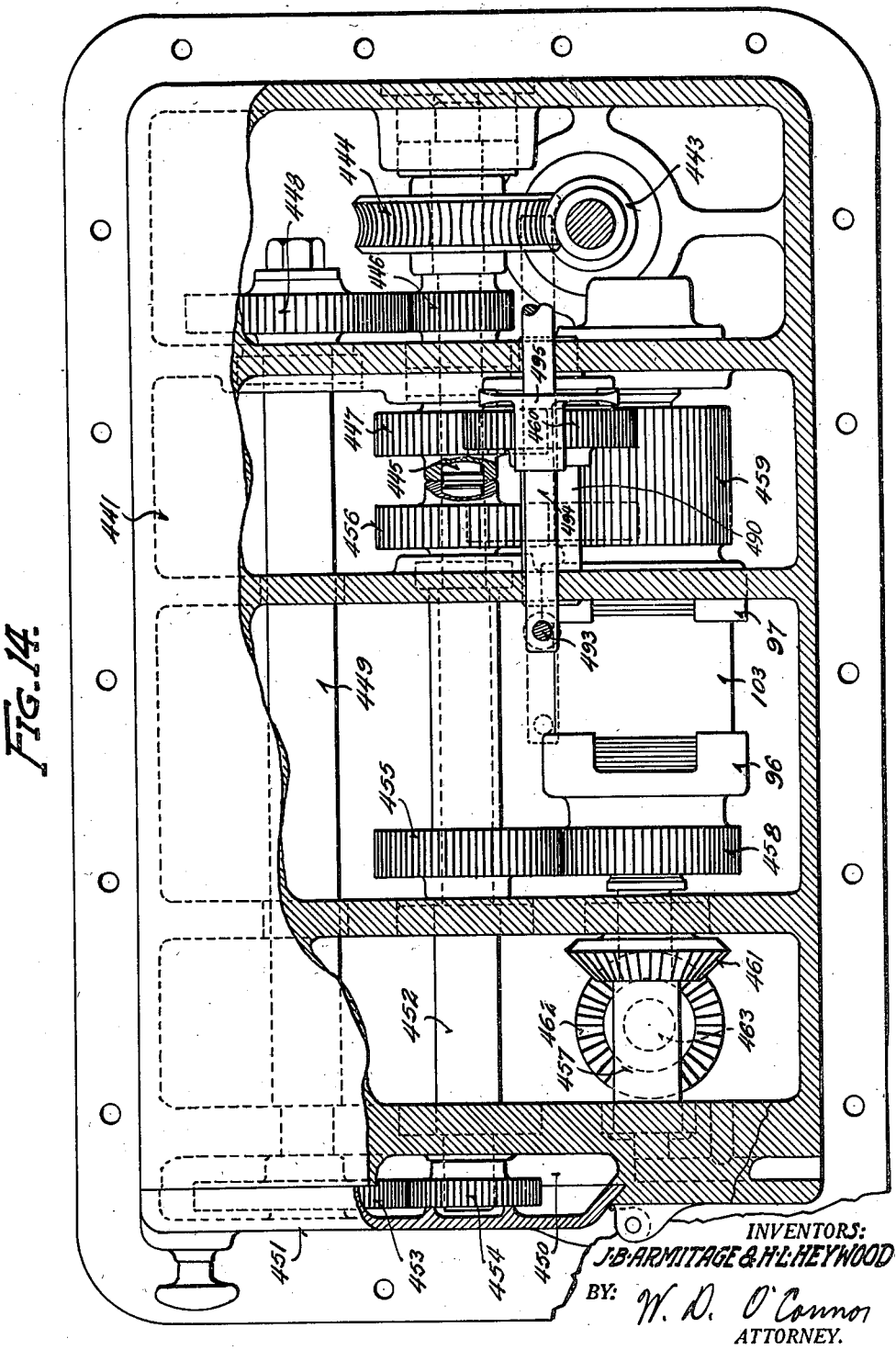

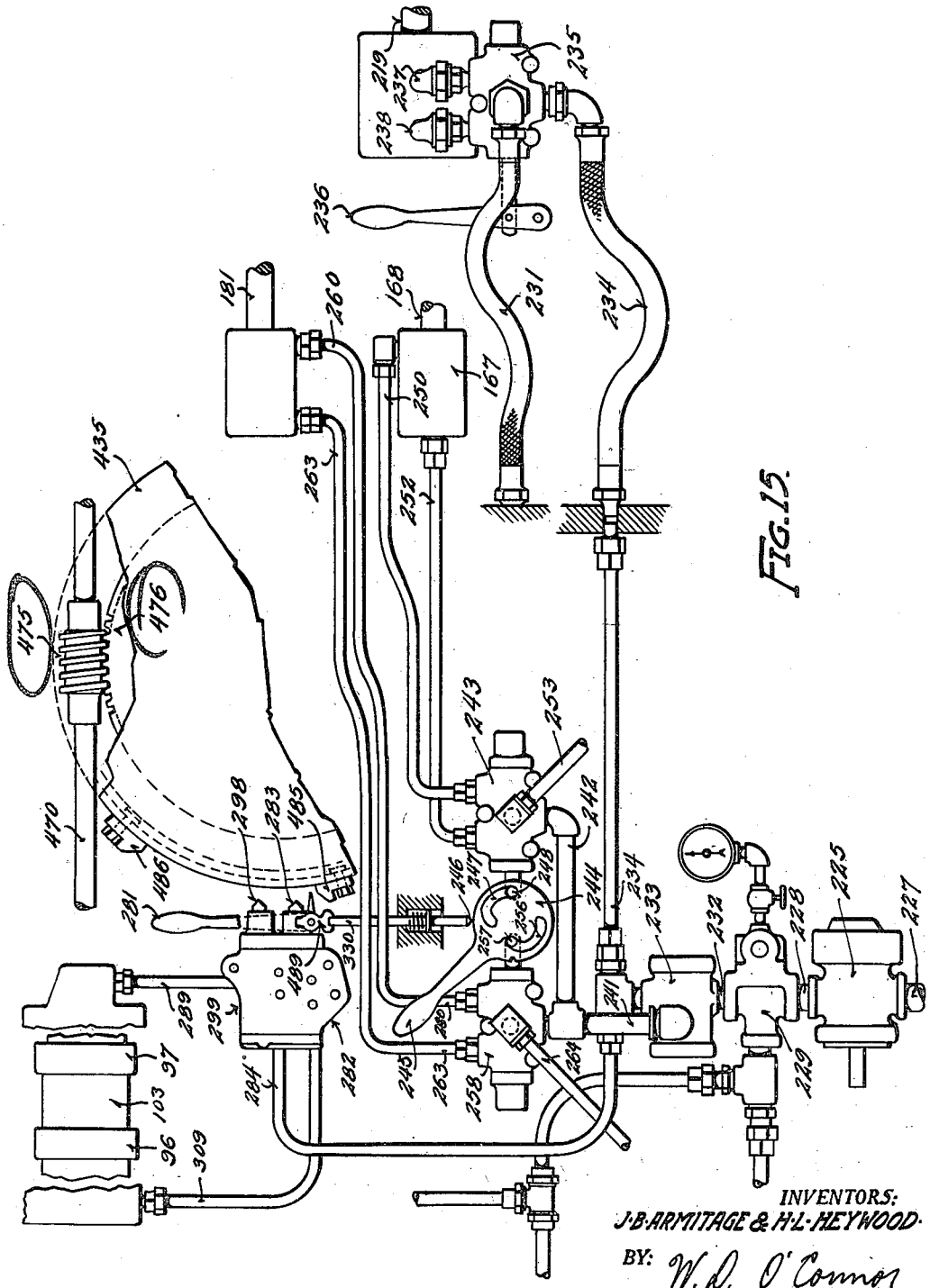

2,392,963

UNITED STATES PATENT OFFICE 2,392,963

MILLING MACHINE

Joseph B. Armitage, Wauwatosa, and Harold L. Heywood, West Allis, Wis., assignors to Kearney & Trecker Corporation, West Allis, Wis., a corporation of Wisconsin Application January 6, 1941, Serial No. 373,274

9 Claims. (Cl. 90—15)

This invention relates generally to milling machines and more particularly to improved actuating and controlling mechanism for a machine especially adapted to mill surfaces in positions difficult of access.

The present specification constitutes a continuation in part of application Serial No. 115,650, filed December 14, 1936, now Patent No. 2,227,620, dated January 7, 1941.

A general object of the invention is to provide a milling machine that is capable of performing milling operations in restricted spaces and that is adjustable to effect either curved or linear cutting strokes or a combination of both.

Another object of the invention is to provide a milling machine especially suitable for operating on work pieces presenting restricted cavities within which milling operations are to be performed.

Another object of the invention is to provide a milling machine for operating in restricted spaces that is provided with an interlocking control mechanism arranged to effect feeding movement of a cutter relative to a workpiece through a predetermined path and to so control the cutter and the workpiece as to prevent relative movement thereof in directions which might result in damage to the machine.

Another object is to provide a milling machine driving mechanism arranged to move a milling cutter selectively through either an arcuate or a linear cutting path.

Another object is to provide an improved feeding and reversing mechanism for moving a supporting element of a milling machine.

A further object is to provide an improved hydraulically operated control system for regulating and coordinating the movements of various elements of a milling machine.

A still further object is to provide an improved hydraulically operated work-feeding mechanism for a milling machine.

According to this invention, a milling machine of the type adapted to perform milling operations in close quarters is equipped with improved transmission and control apparatus arranged to facilitate adjustment of the mechanism and to coordinate operation of the movable elements thereof. The transmission apparatus includes mechanism for positioning and for effecting feeding movements of a plurality of milling cutters and mechanism for holding a workpiece and for moving it into cooperating relationship with the cutters. The control apparatus includes interlocking means arranged to prevent relative movement of the workpiece and the cutters in directions which might result in damage to the machine or destruction of the workpiece. The cutter actuating mechanism is provided with a reversing device having a friction clutch for each direction of operation, the clutches being disposed at opposite sides of a single direct-acting piston that may be moved in opposite directions by hydraulic pressure to engage the respective clutches. Selective means are provided for causing one of the friction clutches to effect return movement of the cutters at either feed rate or rapid traverse rate.

The foregoing and other objects of this invention, which will become more fully apparent from the following detailed description of embodiments thereof, may be achieved by the apparatus herein described by way of example in connection with the illustrations of its structural components in the accompanying drawings, in which:

Figure 1 is a view in rear elevation of a milling machine constructed in accordance with the teachings of the present invention, parts having been broken away to show a portion of the transmission mechanism and portions of the movable cutter supporting elements;

Fig. 2 is a fragmentary view in front elevation of the machine shown in Fig. 1 illustrating the manually operable control elements;

Fig. 3 is a view of the tool supporting and driving mechanism partly in elevation and partly in section to disclose structural features of the mechanisms;

Fig. 4 is a view taken substantially along the plane represented by the line 4—4 of Fig. 1 showing means for imparting rotary movement to the tool supporting sector and also a universally jointed shaft applicable to effect straight line movement of the cutting tool when desired;

Fig. 5 is an expanded view of a portion of the transmission mechanism including the feed rate changing and reversing mechanisms for controlling the movement of the cutter supporting spindles of the machine;

Fig. 6 is a detail view in section taken along the plane represented by the line 6—6 of Fig. 3 showing the adjusting mechanism for the pivotally mounted tool driving motor;

Fig. 7 is a view in vertical section of the work-holding fixture and indexing apparatus taken substantially along the plane represented by the line 7—7 of Fig. 2;

Fig. 8 is a horizontal sectional detail view of the work indexing apparatus taken along the plane represented by the line 8—8 in Fig. 2 showing the manually operable means for rotating the work within the work holding fixture;

Fig. 10 is a detail view of an element of the control mechanism taken along the plane represented by the line 10—10 in Fig. 2;

Fig. 11 is a sectional view of the control element taken along the plane represented by the line 11—11 in Fig. 10;

Fig. 12 is a view in rear elevation showing a modified form of a milling machine constructed in accordance with the teachings of the present invention, parts having been broken away to show a portion of the transmission mechanism;

Fig. 13 is an end elevational view of the machine shown in Fig. 12;

Figure 9:
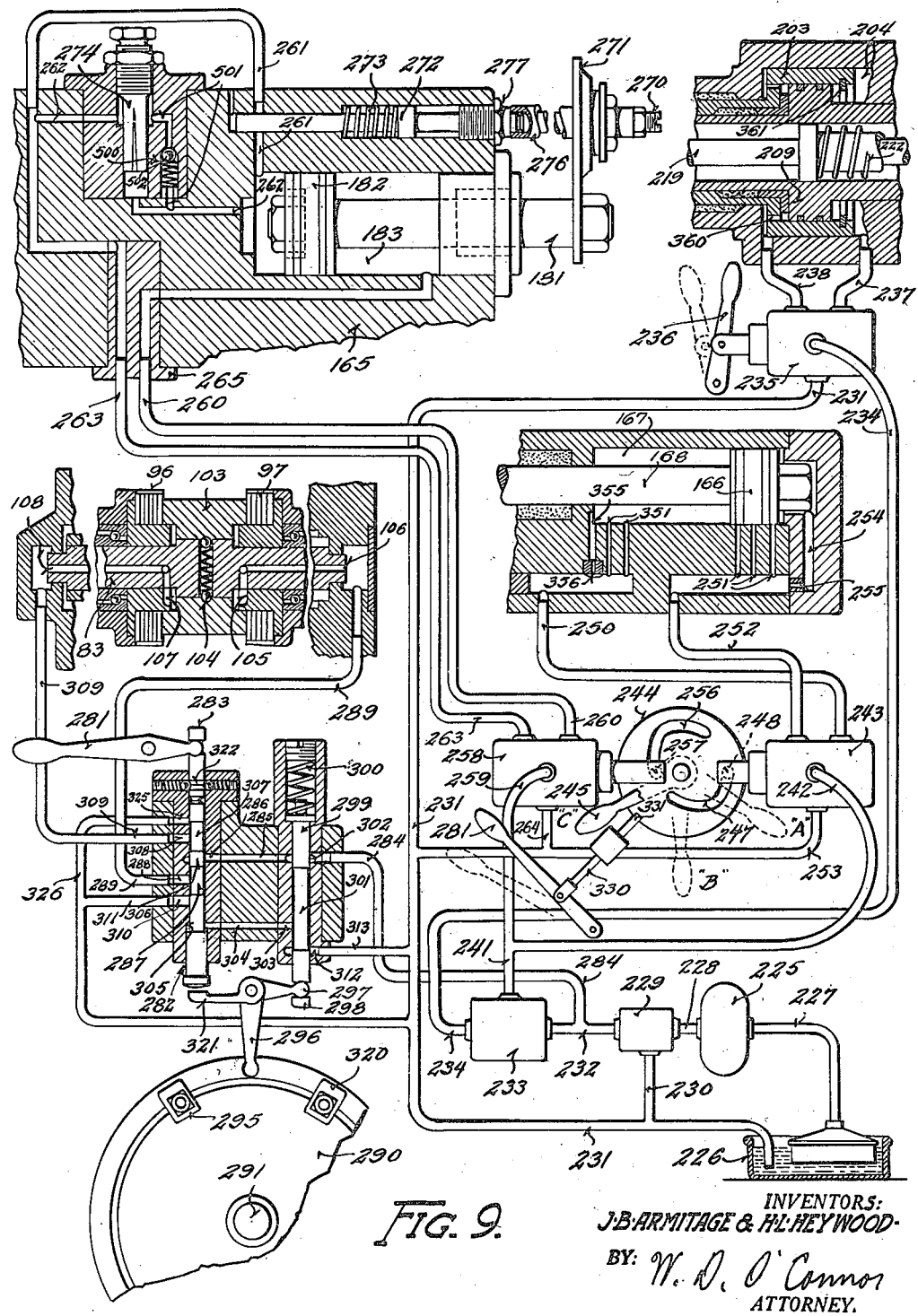
Fig. 9 is a diagrammatic view of the hydraulic transmission and control circuits for effecting coordinated operation of the various movable parts of the milling machine.

Fig. 14 is a vertical sectional view taken substantially along the plane of the line 14—14 of Fig. 12 showing a portion of the transmission mechanism including the feed rate changing and reversing mechanism for controlling the movement of the cutter and supporting spindles of the machine; and Fig. 15 is a diagrammatic view of the hydraulic transmission and control circuits for effecting coordinated operation of the various movable elements of the milling machine shown in Fig. 12.

The machines illustrated in the drawings as constituting apparatus disclosing embodiments of the several features of this invention are milling machines especially adapted for milling arcuate ball raceways, such as are required in a universal joint of the type shown in Patent No. 1,522,351, to Carl W. Weiss, although the machines are also applicable to other uses.

Referring more specifically to the drawings, and particularly to Figure 1 thereof, the miling machine there illustrated comprises, in general, a main frame or bed 20 having at each side an inwardly inclined way for slidably receiving cutter supporting and driving mechanisms or heads 21 and 22, respectively, disposed to cooperate with a work supporting element constituted by a work holding fixture 23 mounted on the front of the base 20 and vertically movable relative thereto.

As may best be seen in Fig. 1, each of the cutter carrying head units includes a driving motor 26 operatively connected to drive a tool spindle 27 which carries at its upper end an end milling cutter 28 in position to operate upon a workpiece 30 held by the work-supporting element 23. As the surfaces to be machined on the workpiece 30 are disposed within cavities difficult of access and are of non-linear contour, it is necessary that the cutter-supporting apparatus be made adjustable to present each of the cutters to the work at a suitable angle and to move the cutters along predetermined paths to form the desired contoured surfaces. To this end, the cutter-supporting spindles 27 are of tapered construction to permit of operation in close proximity to each other, and each driving motor 26 and its associated spindle 27 is mounted in a unitary frame that is so supported as to be adjustable in several directions.

As may be seen in Figs. 1 and 3, the frame of each driving motor 26 is suspended at its top from a pivotal supporting pin 32 in such manner that it may be swung with its associated spindle 27 through an arc to change the angle of presentation of the cutter 28, as is indicated in Fig. 3 by the dotted outline showing the motor frame in its extreme upper position. The pivot pin 32, carrying the frame of the cutter driving motor 26 and the cutter spindle 27, is supported by a bracket or cradle 33 that is slidably mounted for movement forward or backward relative to the machine base upon a cutter-carrying slide 34, as best shown in Fig. 3. The slide 34 is mounted for movement towards or from the middle of the machine, as shown in Fig. 1, upon a pivotally mounted oscillating sector or rotary base 35. The sector 35 is rotatably supported by a pivot pin 36, shown in Fig. 3, upon a main slide or sliding base 37 that slidably engages the inclined way of the frame 20.

Movement of the cutters 28 to mill a surface of arcuate contour is accomplished by turning the sector 35 about its pivot pin 36, as seen in Fig. 3, and the position and degree of curvature of the arcuate surface is determined by the positions assumed by the various adjusting slides. For cutting a lineal surface, the segment 35 is held stationary and the cutter-supporting bracket 33 is moved in a direction from back to front of the machine along the slide 34. Chips resulting from the cutting operation, and coolant applied to the cutters fall between the cutter heads 21 and 22 into a chip basin or trough 41, Fig. 1, formed in the main frame 20, the coolant draining through a screened opening into a coolant reservoir formed within the frame 20. The accumulated chips may be removed at intervals through an opening 43 provided for that purpose in the back wall of the machine, as shown in Fig. 1.

The power driving mechanism for moving the cutter supporting head through a cutting stroke comprises essentially a driving motor 50 that is mounted on the right side of the frame 20 shown in Fig. 1 and is directly connected to drive a feed rate changing and reversing mechanism 51 from which a main driving shaft 52 (see Figs. 1 and 5) transmits power in the desired direction and at the desired rate for moving both the cutter head 21 and the cutter head 22 simultaneously. As shown in Fig. 1, the main driving shaft 52 is connected by bevel gearing 53 to a branch drive shaft 54 associated with the right cutter head 21, and by bevel gearing 55 to a branch drive shaft 56 that is associated with the left cutter head 22. As the driving mechanisms for each of the cutter heads are similar except for being oppositely arranged, the mechanism for the right cutter head 21 only is shown in detail as illustrative of the structure.

As shown in Fig. 1, the branch driving shaft 54 of the cutter head 21 extends into a gear box 57 at the outer side of the frame 20 and has splined connection therein with a sliding gear couplet 58. With the gear couplet 58 in its lower position as shown, power is transmitted to a gear wheel 59 meshing therewith and mounted on a cutter oscillating drive shaft 60 that is operatively connected to rotate the supporting sector 35 about its pivot pin 36. As shown in Fig. 4, the shaft 60 is journalled in the main slide 37 and is provided at its inner end with a bevel pinion 61 that meshes with a bevel pinion 62 connected to a worm 63 also journalled in the slide 37. The worm 63 meshes with worm wheel teeth 64 on the periphery of the sector 35, the arrangement being such that when the worm 63 is rotated by the shaft 60 and the connecting bevel gearing, the sector 35 will be pivoted about the pivot pin 36 in manner to move the milling cutter 28 through an arcuate path.

In order that the sector 35 may be turned manually in adjusting the mechanism, the outer end of the shaft 60 is provided with a squared portion 65 for receiving a hand crank. For adjusting the position of the center of the arcuate movement of the cutter 28 relative to the workpiece 30, the main slide 37 may be moved along the ways on the frame 20 by means of a threaded shaft 66 which is journalled in the frame, as shown in Figs. 2 and 3, and that has threaded engagement with a nut 67 formed on and depending from the slide 37, a squared end portion 68 being provided on the shaft 66 for receiving an adjusting crank. The shaft 60 has splined connection with the gear 59 in the gear box 57 to permit sliding movement therebetween when the main slide 37 is moved relative to the frame 20, and clamping bolts are provided for clamping the main slide to the frame in the adjusted position.

When it is desired to move the milling cutter 28 to effect a linear cutting stroke, the gear couplet 58 on the driving shaft 54 is moved to its upper position at the outer end of the shaft by means of a shifting lever 70 (Fig. 1) in manner to mesh with a gear couplet 71 journalled in the gear box 57 concentric with but independently of the shaft 60 and which has meshing engagement with a gear wheel 72 mounted on a shaft 73 journalled in the upper part of the gear box. As shown in Fig. 4, the shaft 73 may be connected by a flexible drive 74, including two universal joints and an intermediate telescoping shaft, to a short shaft 75 that is journalled in a bracket carried by the slide 34 which is mounted on the segment 35. The shaft 75 is provided at its inner end with a bevel pinion 76 that meshes with a bevel pinion 77 on the end of a threaded feed shaft 78 (Fig. 3) that is journalled in the slide 34 and that engages a nut 79 depending from the cutter supporting cradle 33, whereby the cradle and the cutter driving motor 26 carried thereby may be moved transversely of the slide 34.

The feed rate changing and reversing mechanism 51 for regulating the rate and direction of movement of the milling cutter 28 in its feeding stroke is shown diagrammatically in the expanded view, Fig. 5. As there shown, the driving motor 50 is connected to a driving pinion 81 that meshes with a gear wheel 82 on a main or clutch shaft 83. The main shaft 83 carries a reversing mechanism including a gear wheel 84 mounted on antifriction bearings and that meshes with a gear wheel 85 on a shaft 86 to constitute a forward feed driving train, and the shaft 83 also carries a rotatably mounted gear wheel 87 meshing with an idler pinion 88 that in turn meshes with a gear wheel 89 on the shaft 86 to constitute a reverse driving train for driving the shaft 86 in the opposite direction. Shaft 86 extends into a feed rate change gear compartment accessible by opening a door 90. The feed changing gearing consists of a pick-off gear 91 removably mounted on the end of the shaft 86 and a complementary pick-off gear 92 mounted on the end of a jack shaft 93. The pick-off gears 91 and 92 may be of any selected ratio to transmit power at the desired rate from the shaft 86 to the shaft 93, there being a pinion 94 on the shaft 93 which engages a gear wheel 95 on the main driving shaft 52.

To provide for selecting the direction in which the cutter 28 is moved and for reversing the movement of the cutter at the end of a cutting stroke, the gear wheels 84 and 87 rotatably mounted on the main shaft 83 are arranged to be selectively connected to the shaft 83 by friction clutches 96 and 97 respectively. The friction clutches 96 and 97 are arranged to be engaged alternatively, to operate the cutter driving mechanism in the one or the other direction, by means of a fluid pressure actuated device best shown in Fig. 9 and including a piston element 103 that is slidably mounted on the shaft 83 between the clutches and arranged to be normally urged to a central position therebetween by means of a spring pressed detent mechanism 104. To engage the clutch 96 for driving the mechanism in forward feed direction, fluid pressure is admitted to a chamber 105 at the right end of the piston 103 through a passageway 106 that extends longitudinally of the shaft 83 to the right end thereof, the fluid pressure serving to move the piston 103 to the left, as seen in Fig. 9, and to force the plates of the clutch 96 into engagement. To engage the clutch 97 for driving the mechanism in reverse direction, fluid pressure is admitted to a chamber 107 at the left side of the piston 103 through a passageway 108 extending longitudinally of the shaft 83 to the left end thereof. By reason of the fact that the piston 103 acts directly on the plates of the clutches 96 and 97 under the influence of the fluid pressure, the apparatus is self-adjusting to compensate for any wear to which the clutch plates may be subjected. When pressure is relieved from both the chamber 105 and the chamber 107, the reaction of the engaged clutch and the pressure of the detent spring forcing the detent mechanism 104 into spherical detent notches in the piston 103, returns the piston 103 to the central position in which position both of the clutches are disengaged.

The driving mechanism for rotating the cutter supporting spindle 27 comprises a worm 120 secured on the shaft of the motor 26 and that meshes with a worm wheel 121 fixed with the spindle 27, as shown in Fig. 3. The worm wheel 121 is provided with a relatively long sleeve 122 encircling the spindle 27 and constituting a reenforcing member for stiffening the spindle. The spindle 27 is rotatably supported within a tapered housing 123 that is attached to and constitutes part of the frame supporting the motor 26 and moves therewith as a unit in pivoting about the pivotal supporting pin 32.

In order that the two spindles of the milling machine may operate close together in performing certain milling operations, the housing 123 of each spindle is made in a shape tapering toward the cutter supporting end of the spindle. As near as possible to the cutter receiving end of each spindle, there is provided an anti-friction bearing 124 comprising an outer race 125 mounted in the tapered end of the housing and an inner race 126 formed integrally with the spindle, together with cooperating anti-friction rollers 127 disposed between the outer and the inner races. By forming the inner race integrally with the spindle, the diameter of the bearing 124 is reduced to the minimum and it is possible to place it nearer to the cutter receiving end of the spindle than would be the case if the inner race were formed separately and fitted over the spindle. The spindle 27 is supported at its other end by an anti-friction bearing 128 carried in a cap 129 fitted in the other end of the housing 123. The cutter receiving end of the spindle is of tapered external contour and is provided with a tapered shield 130 protecting the bearing and with a cylindrical cutter shank receiving socket 131 for receiving the cutter 28. The shank of the cutter 28 is provided with a flat side 132 that engages a driving key 133 in the spindle to prevent rotation of the cutter relative to the spindle. Two set screws 134 and 135 are provided in the spindle for engaging the flat surface 132 of the cutter shank to retain the cutter in the socket 131 at any desired position longitudinally thereof.

To provide for positioning the cutter 28 longitudinally relative to the spindle 27 in effecting adjustment of the mechanism for performing a predetermined milling operation or to compensate for change in the length of the cutter resulting from sharpening it, there is provided a positioning rod 137 (see Fig. 3) extending longitudinally through a central bore of the spindle 27 and arranged to engage with its forward end the inner end of the cutter shank. The rod 137 has threaded engagement with the other end of the spindle in such manner that rotation of the rod relative to the spindle results in adjusting the cutter 28 longitudinally of the spindle. For indicating the amount of movement of the cutter relative to the spindle, the adjusting rod 137 is provided at its outer end with a cylindrical indicating dial 138 having graduations disposed to cooperate with an indicating pointer 139 on a cylindrical member 140 in such manner that the cutter may be moved either inwardly or outwardly by a predetermined increment. The cylindrical member 140 is mounted to rotate with the spindle 27 and is associated with an adjusting nut having threaded engagement with the spindle and rotatable thereon for adjusting the spindle bearings. After the cutter 28 has been adjusted, it may be locked in position by tightening the set screws 134 and 135 and the positioning rod 137 may be locked in position by means of a locking mechanism 141 in the exposed end thereof, as more fully shown in the previously mentioned Patent No. 2,227,620.

For positioning the cutter 28 angularly to adapt it for engaging a workpiece, the cutter driving unit may be pivoted about the pivotal supporting pin 32 by means of a pinion 145 that is disposed to mesh with a gear segment 146 formed on the lower arcuate edge of the frame or housing supporting the motor 26 and the spindle 27. As shown in Fig. 6, the pinion 145 is carried on one end of a shaft 147 that is journalled in the supporting cradle 33 and is provided with a squared end 148 for receiving an adjusting crank. After the cutter spindle has been adjusted to the desired inclination, it may be clamped in position by tightening bolts 149 to clamp the frame to the pivot pin 32 and by tightening bolts which engage in an arcuate T slot 150 at the back of the motor frame.

Further adjustment of the position of the cutter 28 relative to the workpiece or to the center of the pivot pin 36 may be accomplished by moving the supporting bracket 33 relative to the slide 34 by means of an adjusting crank applied to a squared end 151 of the threaded shaft 78 shown in Figs. 2 and 3 and the slide 34 may be adjusted in a direction at right angles to the shaft 78 by means of a threaded shaft 152 shown in Fig. 1, that is journalled in a bracket carried by the slide 34 and has threaded engagement with a nut 153 mounted on the pivoted sector 35, the shaft 152 having a squared end 154 for receiving an adjusting crank. Clamping bolts are provided for clamping the bracket 33 to the slide 34 and other clamping bolts clamp the slide 34 to the arcuate sector 35. To machine an arcuate contour on a workpiece, the cutter 28 is set at a proper angle to engage the work and at the proper distance from the pivot axis of the sector 35 by the various adjustments just explained, and the pivotal axis is adjusted relative to the workpiece by moving the main slide 37 as previously explained.

The work supporting fixture 23 is mounted at the front of the machine as shown in Fig. 2, and may be adjusted vertically relative thereto by means of a screw and nut elevating mechanism 160 to position the workpiece 30 in proper relation to the pivotal axes of the cutter heads 21 and 22 to effect the desired machining operation.

As best shown in Figs. 2 and 7, the work supporting element 23 comprises a knee portion 163 that is slidably mounted in vertical ways 164 disposed on the front of the main frame 20, and that may be clamped rigidly thereto in the usual manner in the position to which it is adjusted by the elevating mechanism 160. Pivotally mounted upon the knee 163 for movement about a vertical axis is a work supporting head or saddle 165 that is arranged to be turned from the operating position shown in Fig. 2 through ninety degrees in counter-clockwise direction to a loading position. Pivotal movement of the head 165 is effected by means of a piston 166 shown in Figs. 7 and 9 that operates in a cylinder 167 mounted on the knee 163. The piston 166 is attached to a piston rod 168 provided with rack teeth 169 that mesh with a pinion 170 secured to a depending hub portion 171 of the head 165 that is journalled in the knee 163 by an anti-friction bearing 172. Movement of the pivoting head 165 to the operating position is limited by a positive stop 175 (Fig. 2) on the knee which engages the head and accurately positions it to support the workpiece in alignment with the cutters. Another similar positive stop 176 is provided at the other side of the knee for stopping the head in the loading position. After the head has been pivoted to the operating position, it may be rigidly clamped by means of a circular clamp 177 that engages a gib 178 on the hub 171 of the head and that is actuated by a clamping lever 179 at the left side of the knee.

The pivotally mounted head 165 supports a work holding fixture 180 that is slidably mounted thereon for linear movement toward or from the cutters. As shown in Fig. 7, the fixture 180 has connected to it a piston rod 181 carrying a piston 182 that operates within a cylinder 183 formed in the rotatable head 165. Sliding movement of the fixture 180 is effected by admitting fluid under pressure to the cylinder 183 at one or the other side of the piston 182.

The forward nose portion of the fixture 180 is ararnged to rotatably support a work holder 185 that may be turned about a horizontal axis to position the workpiece for successive cutting operations. As shown in Fig. 7, the workholder 185 is in the form of a sleeve journalled in the fixture 180 and is provided with an encircling bevel gear 186 that meshes with a bevel pinion 187 (Fig. 8), carried on an indexing shaft 188 that is journalled in the fixture 180 at right angles to the sleeve and is provided at its outer end with an indexing crank 189, the gear ratio being such that four turns of the crank 189 result in one complete revolution of the work holder 185.

The work holder 185 is provided with two separate clamps for engaging the workpiece 30 at spaced positions, each clamp being independently operated in a manner to exert substantially equal clamping pressures. As shown in Fig. 7, the work clamp comprises a forward split collet 192 that is supported within the forward end of the work holder 185 against a retaining ring 193 in position to engage a cylindrical portion of the workpiece. The second clamp comprises a similar split collet 194 disposed co-axially with and inwardly of the collet 192 in position to engage another cylindrical portion at the inner end of the workpiece. Although the workpiece is shown as presenting cylindrical surfaces for engagement by the collets 192 and 194, it will be understood that collets of other than cylindrical shape and of other sizes may be substituted for gripping a workpiece of different shape. The two collets 192 and 194 are arranged in abutting relationship and the inner collet is engaged by a retaining ring 195 that is supported from the work holding sleeve 185 by means of pins 196 in such manner as to hold the collets against each other and against the retaining ring 193 to prevent endwise movement thereof.

As shown, both of the collets 192 and 194 are provided with tapered external surfaces for engagement by complementary actuating sleeves 198 and 199 respectively, the sleeve 199 being positioned within the sleeve 198. The sleeves 198 and 199 are also split longitudinally to provide for circumferential resilience and they are so arranged that upon movement toward the forward end of the work holder, they coact with the tapered surfaces of the cooperating collets 192 and 194 and cause them to contract and grip the workpiece. The actuating sleeve 198 is arranged to be operated by a cylindrical sleeve 201 which is operatively connected to it by an anti-friction thrust bearing 202 constituting a swivelling connection permitting the sleeve 198 to turn with the work holder 185 during indexing operations while the sleeve 201 remains stationary within the body of the fixture 180. For moving the sleeve 201 longitudinally to effect clamping action of the collet 192, there is provided a piston 203 which is attached to the end of the sleeve in position to operate within a cylinder 204 attached to the back of the fixture 180 in co-axial relationship with the clamping collets. For moving the inner actuating sleeve 199 there is provided a cylindrical sleeve 207 arranged to operate within the sleeve 201 and having swivelling operative connection with the actuating sleeve 199 by means of an anti-friction thrust bearing 208. The sleeve 207 is also provided with a piston 209 which is arranged to slide within a cylindrical inner surface of the piston 203, the arrangement being such that when the fluid pressure is applied to the back of the piston in the outer end of the cylinder 204, both the piston 203 and the piston 209 will be moved forward independently of each other to apply independent clamping action upon the two portions of the workpiece by the collets 192 and 194.

For positioning the workpiece 30 in the work holder, there is provided a positioning fixture or gauge 215 that is pivotally supported on a bar 216 adjustably mounted on the top of the work holding fixture 180 in such manner that it may be swung down into work-engaging position as shown in Fig. 7 or turned upward to an inactive position as shown in Figs. 1 and 2. When the fixture 215 is in the position shown in Fig. 7, it is adapted to engage the end of a workpiece 30 by means of a plain stop surface 217 extending transversely of the axis of the workpiece and to engage a locating side of the workpiece by means of a transversely adjustable member 218 having a flat positioning surface extending parallel with the axis of the workpiece. The workpiece 30 is urged against the positioning fixture 215 by means of a spring-loaded positioning bar 219 that extends longitudinally through the inner operating sleeve 207 and is urged in forward direction by means of a spring 222. After the workpiece has been positioned in the workholder 185 by the positioning fixture 215, the clamping collets 192 and 194 are contracted to grip the workpiece by admitting fluid pressure to the right end of the cylinder 204 and the positioning fixture is then swung up to its inactive position.

Fluid pressure for actuating the clamping pistons and for operating the other fluid actuated parts of the machine is provided by a pump 225 that is directly connected to the end of the shaft of the driving motor 50, as shown in Fig. 5, for operation thereby to withdraw liquid from a sump 226 in the bottom of the main frame 20 by means of a suction pipe 227. Referring to the circuit diagram in Fig. 9, liquid under pressure from the pump 225 passes through a conduit 228 into a pressure relief valve 229, which serves to limit the pressure in the conduit to a predetermined maximum and to permit any excess liquid to flow through a conduit 230 into a return conduit 231 which leads back to the sump 226. From the relief valve 229, the pressure liquid passes through a conduit 232 into a by-pass valve 233, from which it flows through a conduit 234 to a work-clamping valve 235. To clamp the workpiece, a clamping lever 236 on the valve 235 is moved from the position shown in dotted lines to the solid line position, thereby admitting fluid from the valve 235 through the conduit 237 into the right end of the cylinder 204 to exert clamping pressure upon both the piston 203 and the piston 209 to move them forward and contract the collets 192 and 194. Fluid in the forward end of the cylinder 204 flows outward through a conduit 238 into the valve 235 and thence into the return conduit 231.

After the workpiece has been clamped in the workholder, the pivotally mounted supporting head is turned in clockwise direction to operating position. For this purpose, liquid under pressure flows from the by-pass valve 233 which functions to permit the liquid to pass into a conduit 241 from which a branch line 242 leads to a control valve 243, the arrangement being such that should the pressure in the system drop below a predetermined minimum the by-pass valve 233 will close the conduit 241 to conserve the remaining liquid pressure for action on the work clamping mechanism. The valve 243 controls the swinging or pivoting movement of the work-holding head 165 and it is actuated by a cam plate 244 which may be turned by an operating lever 245, shown in Fig. 9 to any one of three positions, a detent mechanism 246 (Fig. 11) being provided to retain the cam in the selected position. The cam plate 244 is provided with a cam groove 247 that engages a cam follower 248 on the operating stem of the valve 243. The shape of the cam groove 247 is such that when the operating lever 245 is moved from the position A shown in dotted lines to the dotted line position B, the valve 243 will be positioned to admit pressure fluid through a conduit 250 to the inner or left end of the cylinder 167, thereby forcing the piston 166 to the right and turning the work-supporting head 165 clockwise from the loading position to the operating position. Fluid in the outer or right end of the cylinder 167 escapes through a series of exhaust openings 251 into an exhaust passageway 252 and thence through the valve 243 to a conduit 253 that connects to the return conduit 231. As the pivoting head 165 approaches the working position and the piston 166 approaches the right end of the cylinder 167, the exhaust passageways 251 are successively closed by the piston as shown in Fig. 9, thereby reducing the rate of flow of the liquid and checking the movement of the swinging head. After the last one of the exhaust openings 251 is closed by the piston 166, the remaining fluid in the end of the cylinder 167 escapes through an auxiliary passageway 254 having a constricted portion 255 of such limited capacity that the final movement of the work-supporting head into working position occurs very slowly in order that the head may engage the positive positioning stop 175 without shock. After the work supporting head 165 has been turned to working position, it is clamped by actuating the clamping lever 179 to engage the circular clamp 177 with the gib 178 on the hub 171 of the head, thereby drawing the head down tightly upon the top of the knee 163.

To advance the workpiece to the cutters the operating lever 245 may then be moved from position B to position C, the shape of the cam groove 247 being such that no change occurs in the position of the valve 243. In moving the lever from position B to position C, a second cam groove 256 in the cam plate 244 acts upon a cam follower 257 on the stem of a control valve 258 in manner to position the valve for admitting pressure fluid, flowing to it from the conduit 241 through a branch conduit 259, into a conduit 260 that leads to the right end of the cylinder 183 to move the work-holding fixture 180 forward toward the cutters. As the fluid is admitted into the right end of the cylinder 183, it forces the piston 182 to the left and the fluid in the left end of the cylinder escapes through a rapid traverse rate passageway 261 and a feed rate passageway 262, both of which lead to an exhaust conduit 263 through which the exhaust fluid returns to the valve 258 and thence through a conduit 264 to the conduit 253 and the return conduit 231 leading to the sump 226. Both the pressure conduit 260 and the exhaust conduit 263 pass through a cylindrical plug 265 that is mounted in the center of the hub 171 and that constitutes a rotatable connection with the swinging head 165.

The arrangement is such that the fluid pressure acting on the right end of the piston 182 causes the workpiece 30 to advance toward the cutters 28 at rapid traverse rate. As the workpiece approaches the cutters, an adjustable actuating rod 270 carried by a bracket 271 that is mounted on the piston rod 181, moves into contact with a cut-off valve 272, which is slidably mounted in the fixture in cooperating relationship with the rapid traverse passageway 261, and is held in retracted position by a spring 273, the rod moving the valve forward to close off the passageway, as shown in Fig. 9. After the passageway 261 is closed, all of the escaping exhaust fluid from the cylinder 183 must pass through the feed rate passageway 262 which is provided with an adjustable throttle valve 274 by means of which the rate of flow of the exhaust fluid may be regulated in order that the workpiece 30 may be fed against the cutters at a predetermined rate to permit the cutters to feed into the cavities of the workpiece along a linear path. To position the cutters accurately within the workpiece at the point from which the arcuate cutting stroke is to start, the bracket 271 on the piston rod 181 is provided with an adjustable positive stop sleeve 276 which is disposed concentric with the rod 270 and may be set to abut a stop member 277 on the head 165 when the workpiece arrives at the predetermined position.

After the forward feeding movement of the work-holding fixture 180 has been completed, the fixture is clamped to the head 165 by actuating a clamping lever 278 (Fig. 2) to support the workpiece rigidly in position for the feeding or cutting stroke of the cutters 28.

To initiate the cutting stroke, a starting lever 281 associated with a direction controlling valve 282 as shown in Fig. 9, is actuated to move a plunger 283 of the valve to its upper position. With the valve plunger 283 in its upper position, pressure fluid from the pump 225 is permitted to flow by way of the conduit 228, relief valve 229 and conduit 232, through a conduit 284 and a passageway 285 in the body of the valve 282 to a port 286 and thence through a groove 287 in the valve plunger 283 to a port 288, which is connected by a conduit 289 to the passageway 106 in the right end of the driving shaft 83. As previously explained, when pressure fluid is admitted to the passageway 106, it flows into the chamber 105 and forces the piston 103 to the left, thereby engaging the forward driving friction clutch 96 to cause the transmission mechanism 51 to swing the cutting heads 21 and 22 in the forward cutter feeding direction.

During the forward cutting stroke, the cutters 28 each take a roughing cut on the workpiece 20 along an arcuate path. As the cutting stroke progresses, a control drum 290, mounted at the rear of the machine, as shown in Fig. 1, is rotated in clockwise direction, as seen in Fig. 9, by a shaft 291 that is driven by a worm wheel 292 meshing with a worm 293 on the main driving shaft 52 as shown in Fig. 5. At the end of the cutting stroke a reversing trip dog 295 on the drum 290 engages a pivotally mounted trip lever 296 having an arm 297 that engages a plunger 298 of a reversing pilot valve 299, the arrangement being such that when the trip dog 295 moves the trip lever 296 to the right, the plunger 298 is moved upwardly against the resistance of a spring 300 to a position in which a groove 301 on the plunger communicates with a port 302 in the valve body which is connected with the pressure fluid passageway 285. Pressure fluid from the port 302 then flows along the groove 301 to a port 303 connected by a passageway 304 to a chamber 305 encircling the directional valve plunger 283. Pressure in the chamber 305 forces the valve plunger 283 downward below the position in which it is shown in Fig. 9, thereby moving a land 306 of the plunger 283 past the port 286 to cut off the flow of pressure fluid to the port 288 and to permit flow thereof through a groove 307 to a port 308 which is connected by a conduit 309 to the passageway 108 in the left end of the shaft 83. Fluid under pressure from the conduit 309 passes through the passageway 108 into the chamber 107 and forces the piston 103 to the right thereby disengaging the forward feed driving clutch 96 and engaging the reverse driving clutch 97, the fluid in the chamber 105 being forced out through the passageway 106, the conduit 289 and valve port 288, to the groove 287 which now connects with an exhaust port 310 communicating with an exhaust conduit 311 which is connected to the return conduit 231. Upon engagement of the reverse clutch 97, the cutters 28 are moved in reverse feed back along their arcuate paths, to take a finishing cut on the workpiece.

As soon as the control drum 290 has progressed in the reverse direction a sufficient distance to disengage the reversing dog 295 from the pivoted lever 296, the lever is returned to the neutral position shown in Fig. 9, by the action of the spring 300 which moves the pilot valve plunger 298 downward closing the pressure fluid port 302 and opening an exhaust port 312 to permit liquid from the chamber 305 to escape through the passageway 304, the port 303, the groove 301, port 312, and a conduit 313 which connects with the return conduit 231, thereby releasing the directional control valve plunger 283 for movement manually by the lever 281 should it be desired to stop the feeding movement. As the cutters 28 return through the finishing cut to their starting positions, the control drum 290 is turned in counter-clockwise direction until a stop dog 320 on the drum moves into engagement with the trip lever 296. When the stop dog 320 engages the trip lever 296 and moves it to the left, an arm 321 of the lever 296 engages the lower end of the directional control valve plunger 283 and moves it upward to the neutral position shown in Fig. 9, a detent mechanism 322 being provided for retaining the valve plunger in either its central neutral position or its upper forward cutter feed driving position. As may be seen in Fig. 1, the stop dog 320 is provided with an adjusting screw 323 for accurately and rigidly positioning it.

When the valve plunger 283 is in the neutral position as shown in Fig. 9, the pressure port 286 is closed by the land 306, thereby cutting off the supply of pressure fluid to the reversing clutch mechanism, and the groove 287 communicates with the exhaust port 310 to permit exhaust liquid from the chamber 105 of the reversing mechanism to flow through the passageway 106, the conduit 289 and port 288, into the exhaust conduit 311. Also the groove 307 communicates with an exhaust port 325 to permit exhaust fluid from the chamber 107 to flow through the passageway 108, the conduit 309 and port 308 through the port 325 into an exhaust conduit 326 which connects with the exhaust conduit 311. This results in relieving pressure from both sides of the clutch actuating piston 103 and in permitting the piston to move to its central neutral position under the influence of the detent mechanism 104 thereby stopping the feeding movement of the cutter carrying heads.

After the finishing cut movement of the cutters has been terminated, the workpiece may be withdrawn from the cutters for the purpose of indexing it to a new position for a second cut. To insure that the workpiece will not be moved while the cutters are moving through the cutting stroke, a mechanical interlocking arrangement is provided, as shown diagrammatically in Fig. 9, and in detail in Figs. 10 and 11. To this end, the feed starting lever 281 is pivotally connected by a link 330 to an interlocking plunger or control bar 331 that is associated with the control lever 245, the arrangement being such that when the feeding lever 281 is in the neutral position, the interlocking plunger is so placed that the control lever 245 may be moved to any of its three positions. As shown in Figs. 10 and 11, the interlocking plunger 331 is provided with a notch 332 which is positioned to permit a lug 333 on the lever 245 to pass through it in turning the cam plate 244 from one position to another, the control bar 331 preventing movement of the lever 245 when the notch 332 is not in alignment with the lug 333. This interlocking mechanism prevents starting the cutting heads through a cutting stroke when the work-holding fixture is not in operating position inasmuch as under these conditions the lug 333 of the lever 245 then engages the notch 332 and prevents movement of the starting lever 281.

To withdraw the workpiece from the cutters, the workholding fixture 180 is first unclamped by actuating the clamping lever 278 and then the control lever 245 is moved from position C to position B, thereby admitting fluid under pressure from the pump 225 through the control valve 258 and the conduit 263 to the passage 262 leading to the left end of the cylinder 183, causing the piston 182 to move to the right. The workpiece 30 may then be indexed to its new position, in this instance by turning it through one hundred and eighty degrees, to present the other side thereof (as may be seen in Fig. 1) to the cutters. The one hundred and eighty degree indexing movement is accomplished by turning the indexing crank 189 through two complete revolutions and then reengaging a spring pressed pin 335 on the crank in a socket 336 in the body of the fixture 180, as shown in Fig. 8. Turning the crank 189 results in rotating the work-carrying sleeve 185 within the front of the work-holding fixture and with it the clamping collets 192 and 194, together with their actuating sleeves, the rotation of the sleeves being permitted by the swivelling connections afforded by the anti-friction bearings 202 and 208. After the workpiece has been indexed, it is clamped in the new position by actuating a clamping lever 340 after which the work-holding fixture 180 may be moved forward to engage the work with the cutters a second time, by moving the control lever 245 from the position B to the position C, as previously explained. The fixture is then clamped by means of the lever 278 and the second cutting stroke is started by means of the starting lever 281, the mechanical interlock being so arranged that with the lever 245 at position C, the lug 333 is disengaged from the notch 332.

After the second cut has been completed and the directional valve 283 and its lever 281 have been returned to stop position, the notch 332 is again brought into alignment with the lug 333 to permit movement of the control lever 245. The clamp lever 278 is then operated to unclamp the sliding fixture 180 and the control lever 245 is moved from position C to position B to effect retraction of the workpiece from the cutters, as previously explained. In this operation, the cam disc 244 acts as an interlock to prevent turning movement of the work-holding head 165 while the control lever 245 is in position B to avoid swinging the workpiece sidewise against one of the cutters. After the workpiece has been retracted, the work supporting head 165 is unclamped by releasing the circular clamp 177 from the gib 178 by actuating the clamping lever 179, and the control lever 245 is then moved from position B to position A to position the control valve 243 for admitting pressure fluid through the conduit 252 to the right end of the cylinder 167, thereby forcing the piston 166 to the left and turning the work head counterclockwise to the unloading position. Liquid in the left end of the cylinder 167 escapes through a series of exhaust openings 351, which are successively closed by the piston to decelerate the movement, the final movement occurring at slow rate by the escape of liquid through an auxiliary exhaust passage 355 having a constricted portion 356.

After the work-supporting head 165 has been pivoted to the unloading position, the work-clamping lever 236 is actuated to unclamp the workpiece 30 by positioning the valve 235 in a manner to admit pressure fluid through the conduit 238 to the left end of the cylinder 204. The fluid pressure in the left end of the cylinder urges the piston 203 to the right and also exerts pressure on the piston 209 independently by reason of the fluid passing through passageways 360 in the piston 203 to act upon the face of the piston 209. Movement of the pistons 203 and 209 to the right, as seen in Figs. 7 and 9, withdraws the actuating sleeves 198 and 199 from the tapered outer surfaces of the clamping collets 192 and 194 and permits the collets to expand and release the workpiece 30. The pistons 203 and 209 are interconnected by an interlocking lost motion mechanism in such manner as to permit independent clamping action thereof and to provide for cooperative unclamping action. Should either one of the actuating sleeves 198 or 199 resist the unclamping action of its associated piston, the lost motion of the mechanism is taken up by movement of the other piston, and the force exerted by the pressure fluid upon the full area of both pistons is then applied to release the resisting clamp. For instance, should the inner clamping sleeve 199 resist movement, the outer piston 203 in moving to the right would strike against the inner piston 209 exerting a blow or force upon it tending to assist in the unclamping action. If the outer clamping sleeve 198 resists, the inner piston 209 in moving to the right engages a retaining ring 361 in the inner surface of the piston 203 and exerts force thereon to assist in the unclamping action. After the collets 192 and 194 have released the workpiece 30, it may be removed from the work-holding fixture. Any chips or coolant liquid that may drop from the finished workpiece at the loading position are caught in a trough which communicates with the main chip receiving trough at the center of the frame 20. Another workpiece may then be inserted in the workholder and clamped therein by actuating the clamping lever 236 and the cycle of operations just described may then be repeated.

A modified form of milling machine embodying the invention is shown in Figs. 12 to 15 inclusive of the drawings. The apparatus there disclosed, while generally similar to that shown in the previously described form of the invention, comprises a machine embodying improved structural and control features that combine to produce a simplified machine capable of performing the desired operation of accurately milling ball raceways at an increased rate of production. The structural improvements include a simplified cutter supporting mechanism that is designed to provide the same flexibility in the adjustment and movements of the cutter heads obtainable in the other form of the invention with the elimination of the main or base slide. A further improvement disclosed in the modified form of the invention resides in the application of adjustable reversing and stop dogs to the rotatably mounted cutter supporting table to provide improved means for adjusting and accurately controlling the feeding and retracting movements imparted to the milling cutters. An improved transmission mechanism is disclosed including means adjustable to selectively effect the return stroke of the cutters at either a feed or rapid traverse rate of movement. A further improvement includes the provision of valve means in the hydraulic circuit for effecting the more rapid return stroke of the work holder upon completion of the cutting action of the tool in the workpiece. In accordance with the production requirements of a machine of the character of the present invention the modified form of the milling machine shown has been further simplified by the elimination of the knee that provided means for adjusting the elevation of the workpiece, the adjustments afforded the tool being ample to satisfy the requirements. The means for effecting straight line power feeding movement to the cutters has also been eliminated in the modified form of the present invention since this movement is required only on special work other than that for which the present machine is particularly adapted.

Referring specifically to the drawings, and more particularly to Figs. 12 and 13 thereof, the modified form of the milling machine comprises a bed 400 having at each side thereof an inwardly inclined surface 401 on which a bed plate 402 is fixedly mounted to serve as a support for cutter receiving and driving mechanisms or heads 421 and 422 respectively disposed to cooperate with a work supporting element 423 mounted for indexable movement on a top front horizontal surface 403 of the bed 400.

As may best be seen in Fig. 12, each of the cutter heads 421 and 422 includes a driving motor 426 operatively connected to drive a tool spindle 27 constructed and driven in the manner previously described. Each driving motor 426 and tool spindle 27 is secured to a base 433 that is slidably mounted for movement, to adjust the position of the milling cutters 28, with respect to the workpiece 30, upon ways formed in a sliding plate 434 that is mounted for movement upon ways formed in a rotatably mounted table 435 and disposed at right angles to the ways formed in the sliding plate 434. Each table 435 is supported on the inclined surface of the adjacent bed plate 402 and is provided with a hub portion 436 that is journalled for rotation in a suitable bearing 404 formed in the bed plate 402. The rotatable table 435 is retained on the bed plate 402 by a securing ring 405 applied to the lower end of the hub portion 436 thereof.

Movement of either of the cutters 28 to mill a surface of arcuate contour is accomplished by rotating the table 435 on the bed plate 402 and the position and degree of curvature of the arcuate surface is determined by the position of adjustment of the cutter supporting base 433 on the sliding plate 434, the position of adjustment of the sliding plate 434 on the rotary table 435 and the amount of rotary movement afforded the table 435. After the several elements have been properly adjusted they are clamped in desired position in the usual manner.

The power driving mechanism for moving the cutter supporting heads 421 and 422 through the cutting stroke, comprises essentially a driving motor 440 that is mounted on a gear box 441, containing feed rate changing and reversing mechanism 442, the box being secured to the right hand end of the bed 420 (as shown in Fig. 12). The armature shaft of the motor extends into the gear box 441 and is provided with a worm 443 adapted to mesh with and drive a worm wheel 444 (see Fig. 14) secured to a jack shaft 445 journalled in the gear box 441. The jack shaft 445 also has spur gears 446 and 447 secured thereto. The spur gear 446 serves to provide a power take off for the feed rate of movement while the spur gear 447 serves to provide a power take off for rapid traverse movement. The spur gear 446 meshes with and drives a spur gear 448 secured to a counter shaft 449 also journalled for rotation in the gear box 441. The outer end of the shaft 449 terminates in a splined end disposed in a pick-off gear chamber 450 that is accessible by opening a hinged door 451. Another counter shaft 452 arranged parallel with the shaft 449 is journalled in the gear box 441 and is provided with a splined end disposed in the pick-off gear chamber 450. The feed changing gearing consists of pick-off gears 453 and 454 removably mounted on the splined ends respectively of shafts 449 and 452. The pick-off gears 453 and 454 may be of any selected ratio to transmit driving power at the desired rate from the shaft 449 to the shaft 452. The shaft 452 also has spur gears 455 and 456 secured thereto, these gears serve respectively to drive the direction reversing mechanism in forward or reverse direction.

To provide for selecting the direction in which the cutter 28 is to be moved and for reversing the direction of movement of the cutter at the end of a cutting stroke, the spur gears 455 and 456 are arranged to be selectively connected respectively to a shaft 457 that carries direction selecting friction clutches 96 and 97 identical in construction and operation with those previously described in connection with the other form of the invention shown in the accompanying drawings. The clutches 96 and 97 are arranged to be engaged selectively in the manner previously described to operate the cutter driving mechanism in one or the other direction. The clutch 96 serving when engaged to effect the forward movement of the cutter 28 into the workpiece and the clutch 97 serving when engaged to effect the retracting movement of the cutter. One element of the clutch 96 carries a gear 458 that meshes directly with the gear 455 on the shaft 452 to form a connection for driving the mechanism at feed rate in a forward direction. The gear 456 may be connected to a gear 459 on one element of the clutch 97 through a sliding idler gear 460 that may be shifted into meshing engagement with the gears 456 and 459 to provide a connection for driving the mechanism at feed rate in the reverse direction. A bevel gear 461 secured to the shaft 457 meshes with and drives a mating bevel gear 462 secured to a drive shaft 463. The shaft 463 is provided with a safety clutch mechanism 464, shown in Fig. 12, that is operative upon overload to slip to preclude the possibility of damage to the transmission or other parts of the machine.

The means for effecting manual rotary movement of the tables 435 to provide proper angular adjustment thereof for the purpose of setting up the machine prior to the application of driving power is similar for each of the cutter heads 421 and 422, except for being oppositely arranged, the mechanism for the right head 421 only being shown in detail in Fig. 12 as illustrative of the structure.

As shown in Fig. 12, the manually operable table adjusting means includes a shaft 470, arranged parallel with the plate 402, that is journalled in the bed 400 and provided at its outer exposed end with a squared portion 471 adapted to receive a hand crank for effecting manual rotation of the shaft 470. A spur gear 472 secured to the shaft 470 meshes with and drives a mating spur gear 473 secured on a jack shaft 474, journalled in the bed plate 402, that is also provided with a worm 475 adapted to mesh with and drive a worm wheel 476 in the form of a ring that is pressed on and secured to the lower portion of the rotatably mounted table 435. The rotatable tables 435 are provided with graduations 477 disposed about their circumference to be read against a pointer (not shown) to facilitate accurate and identical angular positioning of the rotary tables 435 with respect to the workpiece 30.

The power driving mechanism for effecting movement of the table 435 to move the cutter supporting head 421 through a cutting stroke is derived from the main drive shaft 463 which may be coupled with the shaft 470 by shifting a clutch element 480, that has a splined connection with the shaft 470 and is provided with clutch teeth adapted to engage complementary teeth formed on the hub of a bevel gear 481 that meshes with a mating bevel gear 482 secured to the main drive shaft 463. The means for selectively engaging the clutch element 480 consists of a manually operable lever 483 that is moved from the position shown in Fig. 12 to its other extreme position wherein it effects the establishment of a driving connection between the shaft 463 and the shaft 470 to effect power movement of the rotary table. Identical means oppositely arranged is provided for establishing a driving connection for the cutter supporting head 422.

The means for controlling the extent of movement of the rotary table 435 under power consists of a pair of trip dogs 485 and 486 (Fig. 15) adapted for adjustable positioning in an annular T-slot 487 formed in the outer surface of the right hand rotary table 435 (as shown in Fig. 12). After the starting position for the cutting stroke has been set up by manual adjustment of the several elements of the cutter supporting heads 421 and 422, the trip dog 485 may be adjusted to the proper position in the slot 487 and clamped therein to limit the movement of the tables in one direction by its action upon the valve plunger 283 of the direction controlling valve 282, the valve 282 functioning in a manner identical to that described in connection with the previously described form of the invention. The trip dog 486 may then be adjusted in the slot 487 and clamped therein to set the amount of rotation in the other direction permitted the rotary tables 435. The trip dog 486 acts upon the valve plunger 298 of the reversing valve 299 to effect a reversal in the direction of table rotation in a manner identical with that previously described.

The manual means for effecting movement of the direction valve 282 comprises the lever 281 that transmits movement to the valve plunger 283 through a pair of bevel gears 488 (Fig. 13) secured to the shaft carrying the lever 281 and a control shaft that is also provided with a means at its upper extremity operative to effect movement of an arm 489 that is connected with the valve plunger 283 to shift it upon manual operation of the control lever 281.

The improved transmission disclosed in the modified form of the invention includes manually operable means for selecting the speed of return movement of the cutters 28 at either feed or rapid traverse rate. The means for accomplishing the rate selection of return movement of the cutters 28 comprises the slidable mounting for the idler gear 460. Referring to Fig. 14, it will be noted that the gear 459 forming a part of the clutch 97 is of sufficient width to include both the feed rate driving gear 456 carried by the shaft 452 and the axially aligned rapid traverse rate driving gear 447 carried by the shaft 445. As the result of this arrangement, the idler gear 460, that is slidably mounted on a stub shaft 490 and in constant mesh with the gear 459, may be shifted laterally to selectively engage either the feed rate gear 456 or the rapid traverse rate gear 447. The manually operable means for effecting the rate selection comprises a selector knob 491 (see Fig. 13) that may be shifted from one end of a slot 492 formed in the side of the gear box 441 to the other end of the slot. The knob 491 is threaded onto the outer end of a stud 493 (see Fig. 14) that is anchored in a rod 494 that is slidably mounted for axial movement in the box 441. A shifter fork 495 secured to the rod 494 engages a groove formed in the hub of the idler gear 460 so that the gear 460 is slid along the face of the gear 459 upon axial movement of the rod 494. The rate selection mechanism may be shifted from the rapid traverse rate position shown in Figs. 13 and 14 to feed rate by unscrewing the knob 491 a sufficient amount to free the hub thereof from contact with the enlarged opening formed at the end of the slot 492, the knob may then be moved from the extreme right to the extreme left position (referring to Fig. 13) thus effecting movement of the gear 460 out of mesh with the rapid traverse gear 447 and into mesh with the feed rate gear 456. When this shift has been accomplished, the knob may be turned to effect the advance of its hub portion into the enlarged opening formed at the left end of the slot, to releasably retain the idler gear 460 in mesh with the feed rate gear 456.

A further improvement in the modified form of the invention resides in the provision of an improved valve means in the hydraulic circuit whereby a more rapid return stroke of the work holder 423 may be effected upon completion of the cutting operation of the tool 28 upon the workpiece 30. The improved valve means is shown in Fig. 9 and comprises the inclusion in the adjustable throttle valve 274 of a check valve 500 operable upon movement of the control valve 258 to reverse position "B" to effect rapid movement of the work holder 423 on its return stroke. The check valve 500 is mounted in a by-pass passage 501 disposed in parallel relationship with the passage 262 and arranged to bridge the adjustable throttle valve 274. The by-pass passage 501 is enlarged to receive a spring urged ball 502 constituting the valve element that renders the by-pass passage 501 ineffective during the forward movement of the work holding fixture toward the cutters 28 so that the final feeding movement of the workpiece 30 is controlled in the manner previously described. However, the check valve 500 is operable to permit the full force of the fluid under pressure to initiate the return movement of the piston 182 at a rapid traverse rate immediately upon the reversal of the control valve 258, thus eliminating the delay in the cycle of operation that resulted from the necessity of initiating the return stroke of the piston 182 at the same rate of movement as that required at the final portion of its feeding stroke.

As the elements of the machine not specifically referred to in the description of the modified form of the invention are identical in structure and mode of operation with those described in detail in the portion of the specification referring to the form shown in Figs. 1 to 11 inclusive, of the drawings, it is not deemed necessary to repeat the detailed description of the function and operation of elements common to both forms of the invention.

Although specific forms of the invention have been described in detail in order to disclose clearly the several features of the invention, it is understood that the particular apparatus shown and described are susceptible of various modifications that will be apparent to those skilled in the art without departing from the spirit and scope of the invention as defined in the subjoined claims.

We claim:

1. In a milling machine having a frame carrying a rotatable cutter, a work-holding fixture disposed to be rotated from a loading position to an operating position and to be moved lineally while in said operating position to advance a workpiece into engagement with said cutter, and control mechanism operative to effect said rotary and said lineal movements of said workpiece, said control mechanism being arranged to prevent rotary movement of said work holder while it is in advanced position and to prevent advancing movement thereof except when it is turned to its operating position.

2. In a milling machine, the combination with a main frame and a work-supporting fixture mounted on said frame, of cutter-supporting apparatus including an oscillatable slide pivotally carried by said frame, a reciprocatable slide carried by said oscillatable slide, and a cutter spindle carried by said reciprocatable slide in cooperating relationship with said work-supporting fixture, together with driving mechanism having reversing and speed changing gearing, and selective gearing disposed to connect said driving mechanism to actuate either said oscillatable slide or said reciprocatable slide alternatively, whereby a cutter carried by said spindle may be moved along either an arcuate path or a linear path.

3. In a machine tool having relatively movable work supporting and cutter supporting elements, means for effecting relative movement of said elements selectively in forward or reverse direction including a pair of alternatively engageable hydraulically actuated forward and reverse friction clutches, a speed changing mechanism operatively connected to drive said friction clutches in manner to effect said relative movement at a predetermined feed rate, and a sliding gear associated with said reverse friction clutch and selectively engageable to drive it at feed rate or at rapid traverse rate, whereby relative movement of said supporting elements in reverse direction may be effected by said reverse friction clutch either at feed rate or at rapid traverse rate.

4. In a machine tool having relatively movable work supporting and cutter supporting elements, means for effecting relative movement of said elements selectively in forward or reverse direction including a pair of alternatively engageable hydraulically actuated forward and reverse friction clutches, means for limiting the movement of said cutter supporting elements in both directions, a speed changing mechanism operatively connected to drive said friction clutches in manner to effect said relative movement at a predetermined feed rate, and a sliding gear associated with said reverse friction clutch and selectively engageable to drive it at feed rate or at rapid traverse rate, whereby relative movement of said supporting elements in reverse direction may be effected by said reverse friction clutch either at feed rate or at rapid traverse rate.

5. In a machine tool having relatively movable work supporting and cutter supporting elements, means for effecting relative movement of said elements selectively in forward or reverse direction including a pair of alternatively engageable hydraulically actuated forward and reverse friction clutches, means for limiting the movement of said cutter supporting elements in both directions, a speed changing mechanism operatively connected to drive said friction clutches in manner to effect said relative movement at a predetermined feed rate, and hydraulic control mechanism responsive to contact by said one of said means for limiting the movement of said cutter supporting elements and operative to effect actuation of said clutches in a manner to provide for automatic reversal of said relative movement either at feed rate or rapid traverse rate, said hydraulic control mechanism being responsive to contact by the other of said means for limiting the movement of said cutter supporting elements and operable to effect the automatic disengagement of both of said clutches to stop the movement of said cutter supporting elements.

6. In a machine tool support moving power transmission mechanism, a driven member operatively connected to effect movement of a supporting member, a pair of alternatively engageable friction clutches selectively operable to transmit power to said driven member, a driving mechanism operatively connected to one of said clutches and functioning to drive it in one direction at predetermined feed rate, a driving mechanism operatively connected to the other of said clutches and selectively operable to drive it in the other direction either at feed rate or at rapid traverse rate, and control mechanism operative selectively to engage the one or the other of said clutches.

7. In a machine tool support moving power transmission mechanism, a driven member operatively connected to effect movement of a supporting member, a pair of alternatively engageable friction clutches selectively operable to transmit power to said driven member, a driving gear operatively connected to one of said clutches, a gear engaging said driving gear for driving it in one direction at predetermined feed rate, a driving gear operatively connected to the other of said clutches, a gear slidably engaging said driving gear for driving it in the other direction, means selectively engageable by said sliding gear to effect said driving action at feed rate, and means selectively engageable by said sliding gear to effect said driving action at rapid traverse rate, whereby said supporting member may be driven in the one or the other direction alternatively the drive in one direction being at either feed rate or rapid traverse rate.

8. In a machine tool support moving power transmission mechanism, a driven member, a rotatably mounted cutter supporting member operatively connected with said driven member, a pair of alternatively engageable friction clutches selectively operable to transmit power to said driven member, a feed rate driving gear operatively connected to one of said clutches to drive it in one direction, a slidably mounted idler gear operatively connected to the other of said clutches to drive it in the reverse direction, a feed rate and a rapid traverse rate gear selectively engageable with said idler gear to effect said driving action at the selected rate, adjustable means on said rotatably mounted cutter supporting member for limiting the movement of said cutter supporting member in both directions, and means operative upon engagement with said adjustable means for effecting the operation of said clutches.

9. In a machine tool for machining arcuate cavities within a workpiece, a frame presenting two angularly disposed bearing surfaces, a cutter supporting table rotatably mounted on each of said surfaces, a cross slide mounted on each table for movement transversely thereof, a second cross slide mounted on said first cross slide for movement transversely of said first slide, a tool supporting spindle carried by said second cross slide, a cutting tool carried by said spindle, means for adjusting the position of said tool axially, means for adjusting each of said cross slides to position the tool relative to the axis of rotation of said table, and power driven means for turning both of said tables simultaneously, whereby said cutting tools may be moved along arcuate paths determined by the positions to which they are adjusted by axial movement thereof and by movement of said cross slides.

JOSEPH B. ARMITAGE.
HAROLD L. HEYWOOD.